(12) United States Patent
Derkacz et al.

(10) Patent No.: US 10,301,931 B2
(45) Date of Patent: May 28, 2019

(54) MEASURING WHILE DRILLING SYSTEMS, METHOD AND APPARATUS

(71) Applicant: EVOLUTION ENGINEERING INC., Calgary (CA)

(72) Inventors: Patrick R. Derkacz, Calgary (CA); Aaron William Logan, Calgary (CA); Justin C. Logan, Calgary (CA); Kurtis West, Calgary (CA); Jili (Jerry) Liu, Calgary (CA); Barry D. Buternowsky, Calgary (CA)

(73) Assignee: Evolution Engineering Inc., Calgary (CA)

( * ) Notice: Subject to any disclaimer, the term of this patent is extended or adjusted under 35 U.S.C. 154(b) by 221 days.

(21) Appl. No.: 15/320,014

(22) PCT Filed: May 8, 2015

(86) PCT No.: PCT/CA2015/050421
§ 371 (c)(1),
(2) Date: Dec. 19, 2016

(87) PCT Pub. No.: WO2015/192226
PCT Pub. Date: Dec. 23, 2015

(65) Prior Publication Data
US 2018/0216457 A1 Aug. 2, 2018

Related U.S. Application Data

(60) Provisional application No. 62/013,995, filed on Jun. 18, 2014.

(51) Int. Cl.
*E21B 17/03* (2006.01)
*E21B 47/01* (2012.01)
(Continued)

(52) U.S. Cl.
CPC .......... *E21B 47/122* (2013.01); *E21B 17/003* (2013.01); *E21B 17/028* (2013.01); *E21B 17/042* (2013.01); *H04B 5/0081* (2013.01)

(58) Field of Classification Search
CPC ...... E21B 17/003; E21B 17/028; E21B 47/01; E21B 47/12
See application file for complete search history.

(56) References Cited

U.S. PATENT DOCUMENTS 3,112,442 A * 11/1963 Bennett ................ E21B 47/011
175/50
3,205,477 A * 9/1965 Kalbfell ................ E21B 47/16
367/82

(Continued)

FOREIGN PATENT DOCUMENTS

| GB | 2346509 A | 8/2000 |
| GB | 2389864 B | 8/2005 |

(Continued)

*Primary Examiner* — Kenneth L Thompson
(74) *Attorney, Agent, or Firm* — Oyen Wiggs Green & Mutala LLP (57) ABSTRACT

A downhole system provides a data interface to a first downhole tool such as a steerable rotary tool. The data interface uses a close proximity data connection such as a connection between inductive loops or coils or a direct wired or optical connection. The interface provides data to a second downhole tool in a drill string section adjacent to the first downhole tool. In some embodiments data is passed to a third downhole tool that includes a telemetry transmitter. The third downhole tool may comprise a MWD (measurement while drilling) tool.

40 Claims, 10 Drawing Sheets

(51) Int. Cl.
  *E21B 47/12* (2012.01)
  *E21B 17/00* (2006.01)
  *E21B 17/02* (2006.01)
  *E21B 17/042* (2006.01)
  *H04B 5/00* (2006.01)

(56) References Cited

U.S. PATENT DOCUMENTS

| | | | |
|---|---|---|---|
| 4,605,268 A | 8/1986 | Meador | |
| 5,128,902 A * | 7/1992 | Spinnler | B06B 1/0618 367/155 |
| 5,160,925 A | 11/1992 | Dailey et al. | |
| 5,278,550 A | 1/1994 | Rhein-Knudsen et al. | |
| 5,455,573 A | 10/1995 | Delatorre | |
| 5,675,325 A * | 10/1997 | Taniguchi | B06B 1/04 340/854.4 |
| 5,971,072 A | 10/1999 | Huber et al. | |
| 6,177,882 B1 * | 1/2001 | Ringgenberg | E21B 47/122 324/342 |
| 6,429,653 B1 * | 8/2002 | Kruspe | G01V 3/32 324/303 |
| 6,968,611 B2 | 11/2005 | Hall et al. | |
| 7,098,802 B2 | 8/2006 | Hall et al. | |
| 7,518,528 B2 * | 4/2009 | Price | E21B 17/028 175/40 |
| 7,882,892 B2 | 2/2011 | Svenning et al. | |
| 8,242,928 B2 * | 8/2012 | Prammer | E21B 17/003 340/853.7 |
| 8,994,550 B2 * | 3/2015 | Millot | E21B 47/16 340/854.4 |
| 9,334,696 B2 * | 5/2016 | Hay | E21B 17/028 |
| 2002/0075114 A1 | 6/2002 | Hall et al. | |
| 2003/0147360 A1 * | 8/2003 | Nero | E21B 47/12 370/314 |
| 2004/0113808 A1 | 6/2004 | Hall et al. | |
| 2005/0024231 A1 * | 2/2005 | Fincher | E21B 17/028 340/854.4 |
| 2005/0083161 A1 | 4/2005 | Minerbo et al. | |
| 2009/0166023 A1 | 7/2009 | Svenning et al. | |
| 2010/0201540 A1 | 8/2010 | Li et al. | |
| 2012/0222858 A1 | 9/2012 | Stimpele-Ziegler | |
| 2013/0120093 A1 | 5/2013 | Deville et al. | |
| 2014/0084946 A1 | 3/2014 | Clark et al. | |
| 2014/0090898 A1 | 4/2014 | Moriarty et al. | |
| 2014/0102807 A1 | 4/2014 | Zhao et al. | |
| 2015/0292320 A1 * | 10/2015 | Lynk | E21B 47/123 367/82 |

FOREIGN PATENT DOCUMENTS

| | | |
|---|---|---|
| WO | 9014497 A2 | 11/1990 |
| WO | 0206716 A1 | 1/2002 |
| WO | 2010065205 A1 | 6/2010 |
| WO | 2013142381 A1 | 9/2013 |
| WO | 2014047534 A1 | 3/2014 |
| WO | 2014100275 A1 | 6/2014 |
| WO | 2015031973 A1 | 3/2015 |

* cited by examiner

MEASURING WHILE DRILLING SYSTEMS, METHOD AND APPARATUS

CROSS-REFERENCE TO RELATED APPLICATION

This application claims priority from U.S. patent application No. 62/013,995 filed on 18 Jun. 2014 and entitled MWD SYSTEMS, METHODS AND APPARATUS. For purposes of the United States, this application claims the benefit under 35 U.S.C. § 119 of U.S. patent application No. 62/013,995 filed on 18 Jun. 2014 and entitled MWD SYSTEMS, METHODS AND APPARATUS which is hereby incorporated herein by reference for all purposes.

TECHNICAL FIELD

This application relates to subsurface drilling, specifically, to acquiring information from downhole sensors. Embodiments are applicable to drilling wells for recovering hydrocarbons.

BACKGROUND

Recovering hydrocarbons from subterranean zones typically involves drilling wellbores. Wellbores are made using surface-located drilling equipment which drives a drill string that eventually extends from the surface equipment to the formation or subterranean zone of interest. The drill string can extend thousands of feet or meters below the surface. The terminal end of the drill string includes a drill bit for drilling (or extending) the wellbore. Drilling fluid, usually in the form of a drilling "mud", is typically pumped through the drill string. The drilling fluid cools and lubricates the drill bit and also carries cuttings back to the surface. Drilling fluid may also be used to help control bottom hole pressure to inhibit hydrocarbon influx from the formation into the wellbore and potential blow out at surface.

Bottom hole assembly (BHA) is the name given to the equipment at the terminal end of a drill string. In addition to a drill bit, a BHA may comprise elements such as: apparatus for steering the direction of the drilling (e.g. a steerable downhole mud motor or rotary steerable system); sensors for measuring properties of the surrounding geological formations (e.g. sensors for use in well logging); sensors for measuring downhole conditions as drilling progresses; one or more systems for telemetry of data to the surface; stabilizers; heavy weight drill collars; pulsers; and the like. The BHA is typically advanced into the wellbore by a string of metallic tubulars (drill pipe).

Modern drilling systems may include any of a wide range of mechanical/electronic systems in the BHA or at other downhole locations. Such systems may be called 'downhole tools'. A downhole tool may comprise any active mechanical, electronic, and/or electromechanical system that operates downhole. A downhole tool may provide any of a wide range of functions including, without limitation: data acquisition; measuring properties of the surrounding geological formations (e.g. well logging); measuring downhole conditions as drilling progresses; controlling downhole equipment; monitoring status of downhole equipment; directional drilling applications; measuring while drilling (MWD) applications; logging while drilling (LWD) applications; measuring properties of downhole fluids; and the like. A downhole system may comprise one or more systems for: telemetry of data to the surface; collecting data by way of sensors (e.g. sensors for use in well logging) that may include one or more of vibration sensors, magnetometers, inclinometers, accelerometers, nuclear particle detectors, electromagnetic detectors, acoustic detectors, and others; acquiring images; measuring fluid flow; determining directions; emitting signals, particles or fields for detection by other devices; interfacing to other downhole equipment; sampling downhole fluids; etc.

Downhole tools may communicate a wide range of information to the surface by telemetry. Telemetry information can be invaluable for efficient drilling operations. For example, telemetry information may be used by a drill rig crew to make decisions about controlling and steering the drill bit to optimize the drilling speed and trajectory based on numerous factors, including legal boundaries, locations of existing wells, formation properties, hydrocarbon size and location, etc. A crew may make intentional deviations from the planned path as necessary based on information gathered from downhole sensors and transmitted to the surface by telemetry during the drilling process. The ability to obtain and transmit reliable data from downhole locations allows for relatively more economical and more efficient drilling operations.

Many downhole tools do not include telemetry transmitters. Such downhole tools may store information for retrieval when the tool is returned to the surface or for retrieval by a wireline tool lowered to the location of the downhole tool on a wire. In addition or in the alternative, such downhole tools may interface to another system that includes a telemetry transmitter to send data to surface equipment.

A wide variety of downhole tools are provided by a wide range of manufacturers. Different downhole tools may make data available in different formats and/or using different protocols. This makes it difficult and/or undesirably expensive to create a downhole system which uses downhole tools from different manufacturers to provide selected functionalities.

Different telemetry techniques include transmitting information by generating vibrations in fluid in the bore hole (e.g. acoustic telemetry or mud pulse (MP) telemetry) and transmitting information by way of electromagnetic signals that propagate at least in part through the earth (EM telemetry). Other telemetry techniques use hardwired drill pipe, fibre optic cable, or drill collar acoustic telemetry to carry data to the surface.

A typical arrangement for electromagnetic telemetry uses parts of the drill string as an antenna. The drill string may be divided into two conductive sections by including an insulating joint or connector (a "gap sub") in the drill string. The gap sub is typically placed at the top of a bottom hole assembly such that metallic drill pipe in the drill string above the BHA serves as one antenna element and metallic sections in the BHA serve as another antenna element. Electromagnetic telemetry signals can then be transmitted by applying electrical signals between the two antenna elements. The signals typically comprise very low frequency AC signals applied in a manner that codes information for transmission to the surface. (Higher frequency signals attenuate faster than low frequency signals.) The electromagnetic signals may be detected at the surface, for example by measuring electrical potential differences between the drill string or a metal casing that extends into the ground and one or more ground rods.

There remains a need for downhole systems that can readily acquire data from other downhole tools.

SUMMARY

This invention has a number of aspects including methods for transmitting data in downhole environments, methods and apparatus for providing data interfaces to downhole tools and downhole systems which are operative to transfer data among downhole tools.

One example aspect provides a downhole system comprising first, second and third downhole tools. The first downhole tool is in data communication with the third downhole tool by way of the second downhole tool. The first downhole tool is in data communication with the second downhole tool by way of a close proximity data connection and the second downhole tool is in data communication with the third downhole tool by way of a short hop wireless data communication link having a range greater than that of the close proximity data connection. The first and second downhole tools are provided in adjacent sections of a drill string.

The second downhole tool may, for example, have the form factor of a sub that is coupled in line with the drill string or a probe that is within a bore of the drill string. In some embodiments the first and second downhole tools each has the form factor of a sub coupled in line with the drill string adjacent to one another.

The close proximity data connection may comprise a data connection between an inductive loop or coil in the first downhole tool and an inductive loop or coil of the second downhole tool. In other embodiments the close proximity data connection comprises a direct wired or optical connection, a short-range wireless connection or the like.

In some embodiments the second downhole tool has the form of a sub comprising a first coupling at one end and a second coupling at another end and the second downhole tool comprises a first data interface adjacent to the first coupling and a second data interface adjacent to the second coupling. The second downhole tool may be operable to communicate with the first downhole tool by way of the first data interface or the second data interface. In some embodiments the second downhole tool is configurable to communicate with the first downhole tool by way of the first data interface and with another downhole tool by way of the second data interface.

Where the second downhole tool has the form factor of a probe, the second downhole tool may be landed in a drill string section that is coupled to the sub. The drill string section may be very short (e.g. it may have a length of 3 feet (about 1 meter) or less). In some embodiments the probe is supported in the bore between first and second spiders which are each supported by a corresponding landing in the drill string section. An axial position of the probe relative to the drill string section may be adjustable. In an example embodiment spacers are provided between one or both of the first and second spiders and the corresponding landings, the spacers movable to adjust an axial positioning of the probe relative to the sub. In some embodiments the probe projects axially from the drill string section into the sub. In some embodiments at least an end of the probe that projects into the sub is movable and is biased toward the sub.

The short hop wireless data communication link may, for example, comprise a transmitter in the second downhole tool connected to apply a voltage across a first electrically-insulating gap portion that separates electrically-conductive parts of the drill string uphole and downhole from the first gap portion. The third downhole tool may comprise a second electrically-insulating gap portion that separates electrically-conductive parts of the drill string uphole and downhole from the second gap portion and the third downhole tool comprises a short-hop telemetry receiver connected to monitor voltages across the second gap portion. The third downhole tool may communicate data toward the surface by applying telemetry signals across the second gap portion. In other embodiments the short hop wireless data communication link may comprise a radio-frequency data communication protocol.

The second downhole tool may comprise a controller and a tool library. The controller is configured to: obtain a signal from the first downhole tool by way of the close proximity data connection, process the signal to identify one or more properties of the signal, use the one or more properties to look up in the tool library a set of one or more communication parameters, and configure the close proximity data connection according to the one or more communication parameters. The one or more properties of the signal may include a signal frequency. The second downhole tool may optionally be configured to receive data from the first downhole tool on the close proximity data connection and to pass a subset of the received data to the third downhole tool by way of the short hop wireless data communication link.

In some embodiments the second downhole tool is configured to receive data from the first downhole tool on the close proximity data connection and to pass only a subset of the received data to the third downhole tool by way of the short hop wireless data communication link.

Further aspects of the invention and features of example embodiments are described herein and/or illustrated in the accompanying drawings.

BRIEF DESCRIPTION OF THE DRAWINGS

The accompanying drawings illustrate non-limiting example embodiments of the invention.

DESCRIPTION

Throughout the following description specific details are set forth in order to provide a more thorough understanding to persons skilled in the art. However, well known elements may not have been shown or described in detail to avoid unnecessarily obscuring the disclosure. The following description of examples of the technology is not intended to be exhaustive or to limit the system to the precise forms of any example embodiment. Accordingly, the description and drawings are to be regarded in an illustrative, rather than a restrictive, sense.

Figure 1:
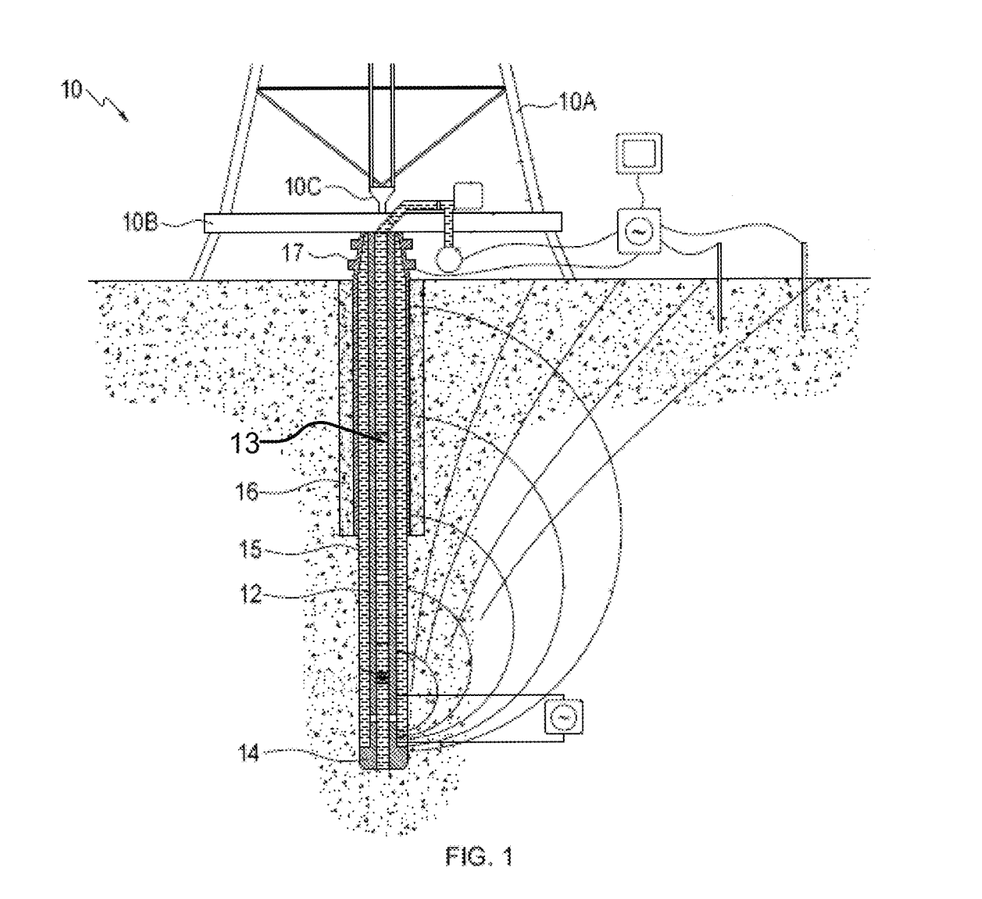
FIG. 1 is a schematic view of a drilling operation.

FIG. 1 shows schematically an example drilling operation. A drill rig 10 drives a drill string 12 which includes sections of drill pipe that extend to a drill bit 14. The illustrated drill rig 10 includes a derrick 10A, a rig floor 10B and draw works 10C for supporting the drill string. Drill bit 14 is larger in diameter than the drill string above the drill bit. An annular region 15 surrounding the drill string is typically filled with drilling fluid. The drilling fluid is pumped through a bore 13 in the drill string to the drill bit and returns to the surface through annular region 15 carrying cuttings from the drilling operation. As the well is drilled, a casing 16 may be made in the well bore. A blow out preventer 17 is supported at a top end of the casing. The drill rig illustrated in FIG. 1 is an example only. The methods and apparatus described herein are not specific to any particular type of drill rig.

One aspect of this invention provides a downhole tool comprising a telemetry transmitter and, optionally, a range of sensors. The downhole tool is configured to communicate with other downhole tools, such as off-the-shelf neutron density, resistivity, spectral gamma, oil/water cut meters, or the like. In some embodiments, the downhole tool incorporates MWD sensors (e.g. sensors that provide information regarding the inclination and/or direction of a portion of the drill string in which the downhole tool is located).

Figure 2:
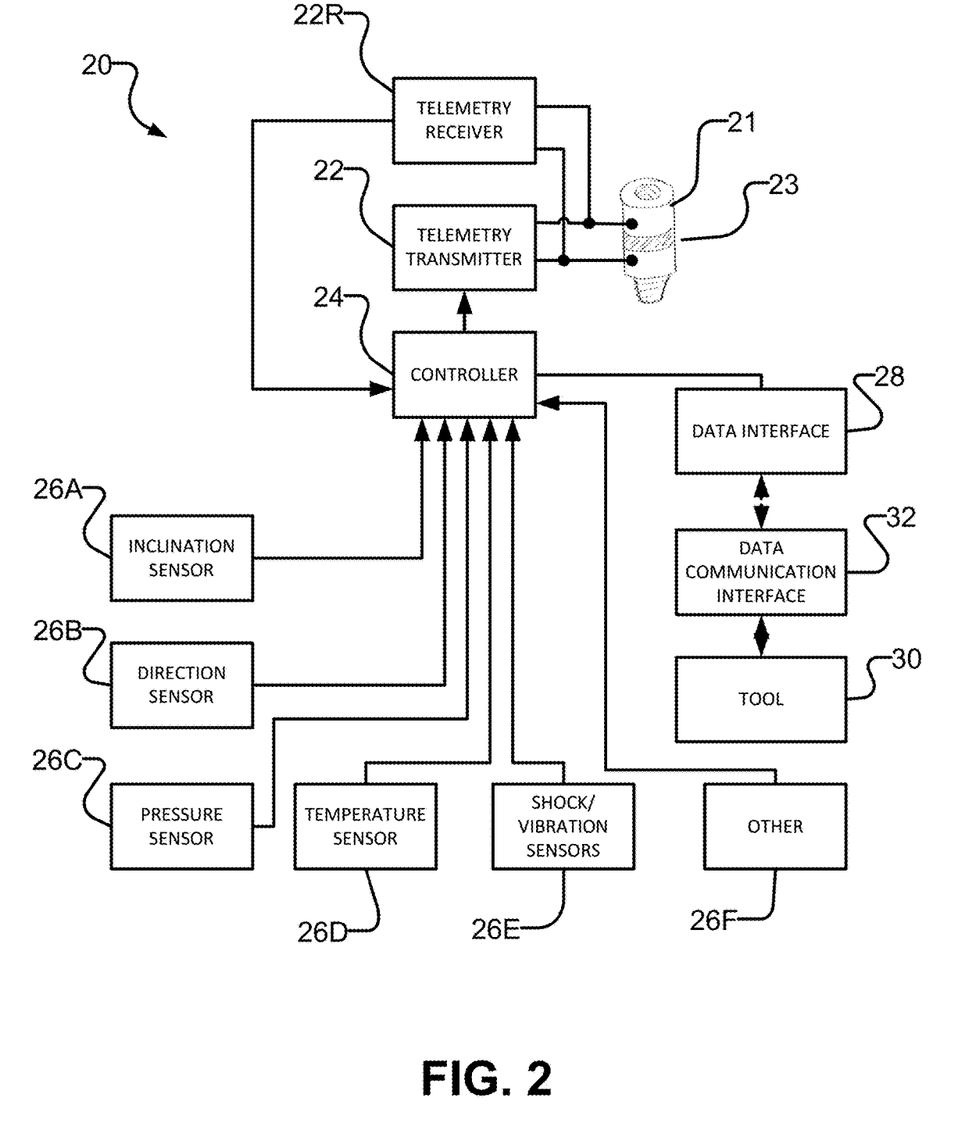
FIG. 2 is a block diagram of an example downhole system.

FIG. 2 is a block diagram illustrating functional components of an example tool 20. Tool 20 incorporates or is used together with a sub 21. Tool 20 includes a telemetry transmitter 22. In the illustrated embodiment, telemetry transmitter 22 is an EM telemetry transmitter (a "gap-based" EM telemetry transmitter) which is coupled across an electrically-insulating gap portion 23 provided by a sub 21. Gap portion 23 provides electrical insulation between an uphole portion of sub 21 and a downhole portion of sub 21. Tool 20 also includes a controller 24 which, inter alia, controls telemetry transmitter 22 to send data and a plurality of sensors 26.

In the illustrated embodiment, sensors 26 include an inclination sensor 26A, a direction sensor 26B, a pressure sensor 26C, a temperature sensor 26D, a shock and vibration sensor 26E, and other sensors 26F. Other embodiments may have a different set of sensors 26. Sensors 26 are coupled to controller 24 such that controller 24 can read values from sensors 26, and can process those values and/or transmit those values by way of telemetry transmitter 22. Some embodiments may not include any sensors 26.

Coupled to controller 24 is a data interface 28 designed to provide communication between controller 24 and another downhole tool. Interface 28 may, for example, comprise an inductive loop or coil extending around a bore of sub 20. FIG. 2 illustrates another adjacent tool 30 having a data communication interface 32 connected to it. Data communication interface 32 may comprise another inductive loop, for example. Tool 30 can convey information, for example, sensor readings from sensors in tool 30, to controller 24 of tool 20 by modulating an electrical current in inductive loop 32 to encode data representing the sensor readings. These modulations are picked up by interface 28 which supplies the encoded data to controller 24. Controller 24 may then store the encoded data retrieved from tool 30 and/or transmit the encoded data by way of EM telemetry transmitter 22 (or another telemetry transmitter such as an MP telemetry transmitter) either with or without first processing that data at tool 20.

Controller 24 may additionally transmit data to tool 30 by way of interface 32. For example, controller 24 may receive downlink data, which may include commands for tool 30 by way of a telemetry receiver 22R. Controller 24 may then pass those commands or other data to tool 30 by way of interface 32.

One issue faced by users who wish to use downhole telemetry tools together is that such tools can tend to be quite long. The tools are typically provided in the form of probes received within a bore of the drill string. In a typical situation a probe having telemetry capability is used to transmit data from a downhole measurement tool that includes various sensors. The telemetry probe is typically landed on a landing in an off-the-shelf drill collar that is typically made of a non-magnetic material (so as not to interfere with magnetic sensors in the measurement tool). The landing is typically at one end of the collar (either the uphole or downhole end). There is no standard length for non-magnetic drill collars and so, in different jobs, an off-the-shelf telemetry probe may be landed at drastically different locations relative to a measurement tool from which it is expected to receive data. This can make it difficult to get the induction loop of the telemetry tool to line up with an inductive loop of another tool, such as a measurement tool, within an acceptable tolerance. It is typical in the prior art to need to adjust the positioning and/or overall length of telemetry probes with spacers to achieve the desired alignment. Even then significant misalignment of induction loops is common. This can result in degraded communication and/or the requirement to use more power to transmit data signals between induction loops.

Figure 2A:
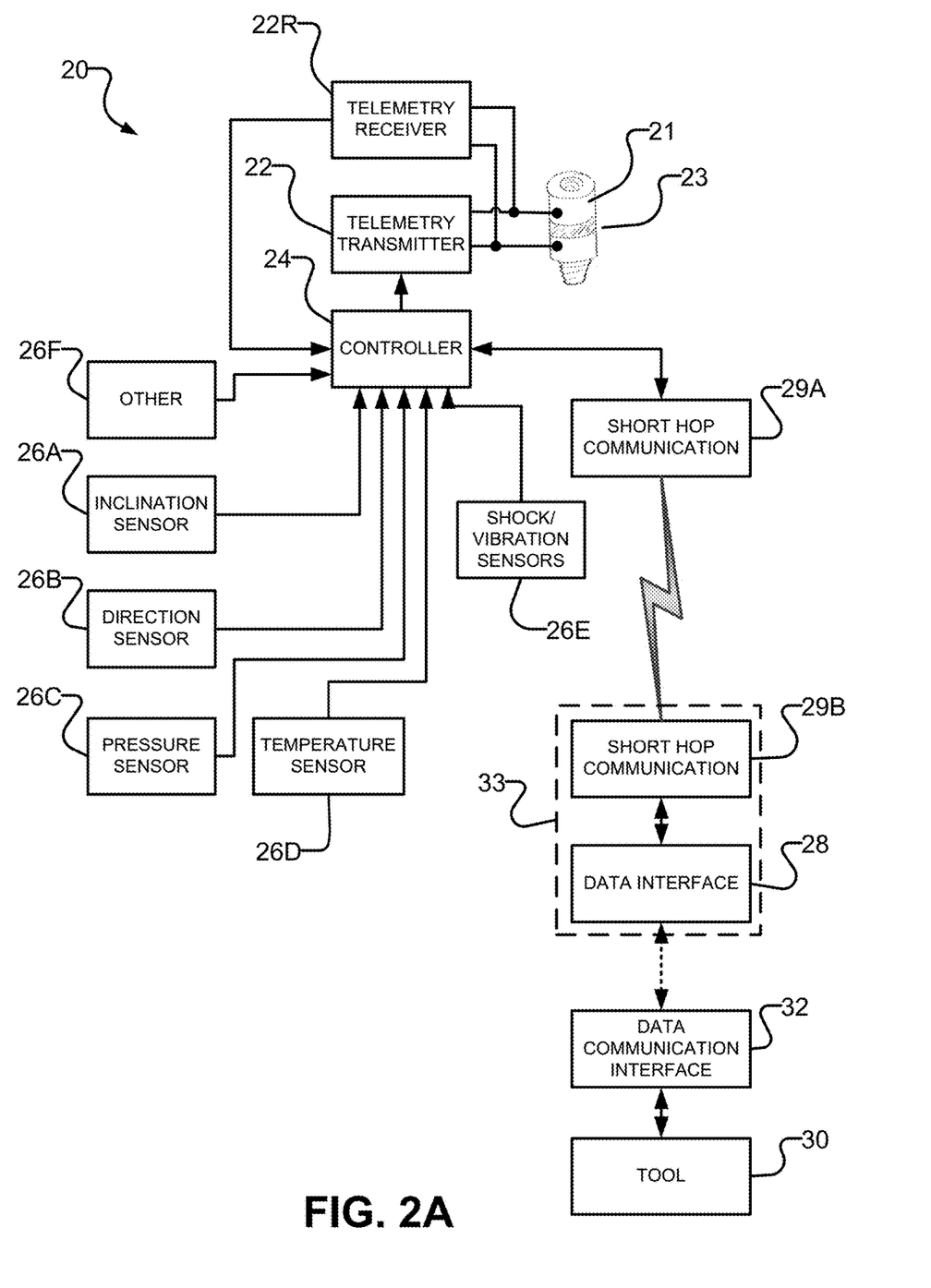
FIG. 2A is a block diagram of another example downhole system.

FIG. 2A is a block diagram of a system similar to that shown in FIG. 2 except that tool 20 now communicates with tool 30 by way of a short hop communication link 29 that includes components 29A and 29B. For one-way communication from tool 30 to tool 20 component 29B may be a transmitter and component 29A may be a receiver. Some embodiments provide two-way communication between tools 20 and 30. In such embodiments components 29A and 29B may each comprise a data transceiver or a system that includes at least one data transmitter and at least one data receiver.

Short hop component 29B and communication interface 28 may be combined in a separate tool 33. Tool 33 may have its own housing and power supply. One advantage of the arrangement of FIG. 2A is that it removes constraints on the location of tools 20 and 30. Each tool may be located in a position desirable for that tool as long as tools 20 and 30 are both within the range of communication link 29. Another advantage is that tool 33 may be designed to facilitate alignment of data interfaces 28 and 32 with one another.

In some embodiments, short hop communication link 29 uses electromagnetic signals to communicate between components 29A and 29B. In some cases these signals may have frequencies much higher than those used for EM telemetry communication to surface equipment. In an example embodiment, short hop communication link is provided using the technology described in PCT publication WO 2015/031973 which is hereby incorporated herein by reference for all purposes.

Tool 33 may have various form factors. In some embodiments tool 33 has the form of probe that is received within bore 13 of the drill string. In such embodiments, tool 33 may be used in combination with a sub designed to support tool 33 for optimum data communication with tool 30. In some embodiments tool 33 may be in the form of a drill string section or 'sub' that forms a part of the drill string. In either case, especially because tool 33 needs to provide only limited functionality (tool 33 does not need to include any large sensors, for example) tool 33 may be very compact compared to tool 20 and/or tool 30. In some embodiments, tool 33 is 3 feet (about 1 m) long or less.

Figure 3A:
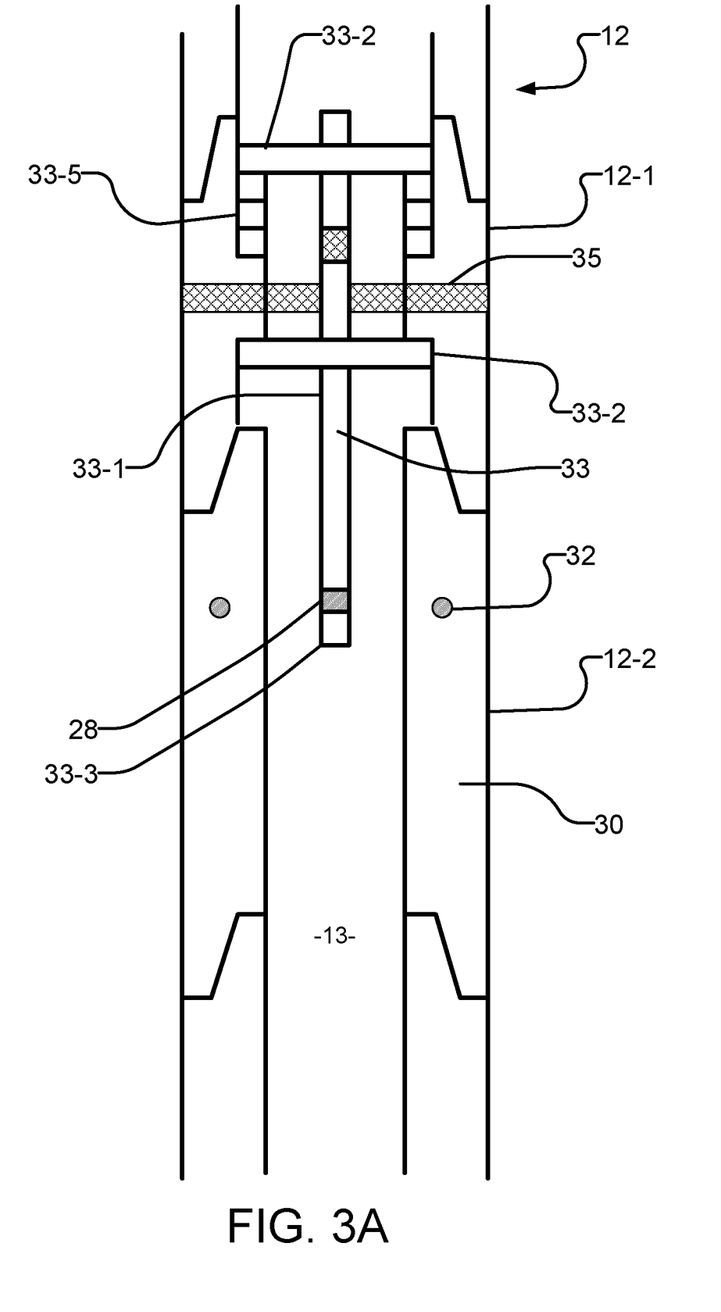
FIG. 3A is a schematic cross section elevation through a section of drill string comprising a sub containing electronics coupled to communicate with a tool contained in a probe received in a bore of a drillstring.

FIG. 3A shows an example embodiment wherein tool 33 has the form of a probe 33-1 supported in bore 13 by supports 33-2 which may, for example, be in the form of spiders (like spoked or apertured disks) that allow fluid to pass tool 33 while firmly supporting the body of probe 33-1 in bore 13. Supports 33-2 engage corresponding landings in a sub 12-1. An end 33-3 of probe 33-1 extends out of the bore of sub 12-1 into a bore of tool 30 which, in this embodiment, has the form of a sub 12-2 that makes up a part of drill string 12. This arrangement closely aligns data communication interfaces 28 and 32. Data interfaces can be in the form of inductive coil to coil, a hardwire connector, or a physical attachment to the tool 30.

In the embodiment of FIG. 3A, sub 12-1 includes an electrically insulating portion (a 'gap') 35 and tool 33 may communicate to tool 20 (which may be uphole or downhole from tool 33) by applying voltages across gap 35. Voltage may be applied, for example, by way of supports 33-2 which may be electrically conductive and may land on opposing sides of gap 35.

It is sometimes necessary to re-cut the threaded couplings of subs or other drill-string sections. A single re-cutting may not adversely affect alignment of data communication interfaces 28 and 32 very much. In some embodiments, sub 12-1 is designed such that data communication interface 28 is initially high relative to data communication interface 32 such that an initial re-cutting of the threads of the couplings that couple subs 12-1 ad 12-2 will improve the alignment of data communication interfaces 28 and 32. In some embodiments spacers 33-5 are provided to allow easy adjustment of the alignment of communication interfaces 28 and 32. If alignment is disturbed by re-cutting of threads coupling subs 12-1 and 12-2 (resulting in one or both of these subs being made shorter) then one or more of spacers 33-5 may be moved from the landing closest to sub 12-2 to the landing away from sub 12-2. As a further alternative, probe 33-1 may be constructed to allow adjustment of the positions of couplings 33-2 along the body of probe 33-1 (e.g. by means of threaded couplings, spacers, pins or the like).

As a further alternative, a probe may be telescoping or spring loaded such that an end of the probe (or the entire probe) is movable relative to the drill string. The probe may include a surface that abuts an abutment surface of tool 30 such that the end of the probe that supports the interface to tool 30 automatically has a fixed spatial relationship to the abutment surface. Through the use of adjustment spacers and/or telescoping and/or spring-loaded features an end of the probe may have a fixed attachment to the top of tool 30. The fixed attachment may provide a pressure-rated connection, or a harsh-environment direct electrical connection between tools 33 and 30.

In another embodiment tool 33 has the form factor of a sub 12-3. Electronics may be enclosed in a compartment in a wall of the sub. In this embodiment, interface 28 may comprise an inductive loop or coil that is located within or on a wall defining bore 13 within sub 12-3. For example the loop or coil may be located within an electronics module or a removable cartridge located in a compartment in a wall of sub 12-3. The compartment may comprise an annular compartment extending around a bore of sub 12-3, a pocket in a wall of sub 12-3 or the like. The loop or coil does not necessarily extend around a bore of sub 12-3. The loop or coil may have various orientations. In some embodiments the loop or coil is oriented such that an axis of the loop or coil extends radially relative to sub 12-3. In such embodiments the loop or coil may be used to facilitate data communications by way of one or more corresponding loops or coils in a probe located within the bore of sub 12-3 or in another nearby downhole tool. In some embodiments the axis of the loop or coil extends generally parallel to a longitudinal axis of sub 12-3.

Figure 3B:
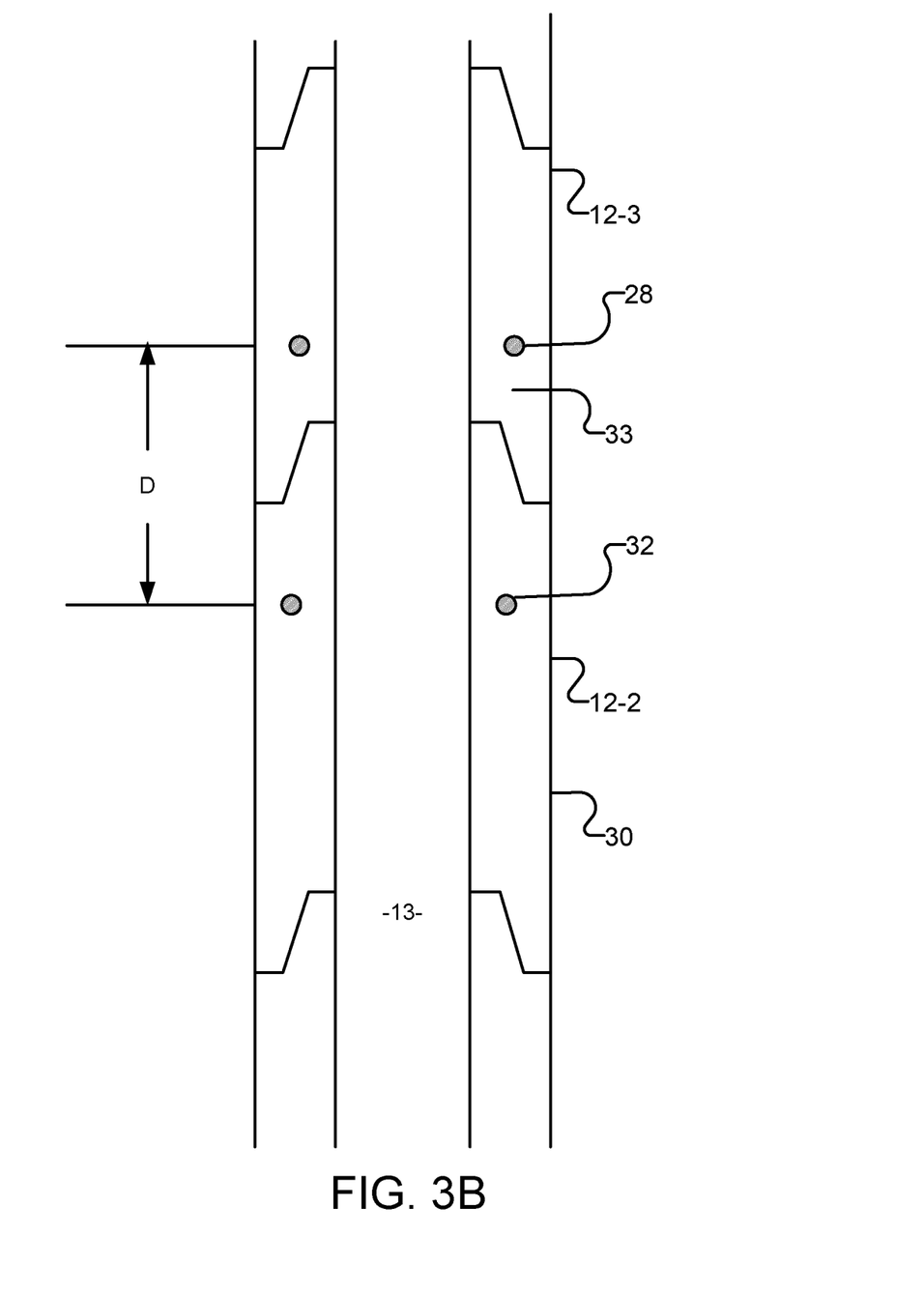
FIGS. 3B and 3C are schematic cross section elevations through a drill string containing first and second subs containing electronics and/or sensors arranged to communicate with one another.

A tool 33 having the form factor of a sub may be used to communicate with tools 30 that have the form factor of a probe or with tools 30 that have the form factor of a sub, or both. FIG. 3B shows an example embodiment where a tool 33 including its communication interface 28 is provided in a sub 12-3. In FIG. 3B tool 30 is provided in a sub 12-2 which is coupled into drill string 12 adjacent to sub 12-3.

Tool 33 includes an inductive loop 28 and tool 30 includes an inductive loop 32. The spacing, D, between inductive loops 28 and 32 is fixed, given by the distances between coils 28 and 32 from the couplings at the ends of sub 12-3 and tool 30, and may be relatively short (e.g. less than 2feet—about 0.6meters). Providing a relatively small spacing D between inductive loops 28 and 32 can permit exchange of data between inductive loops 28 and 32 with much lower power than would be required for more widely-spaced inductive loops.

Figure 3C:
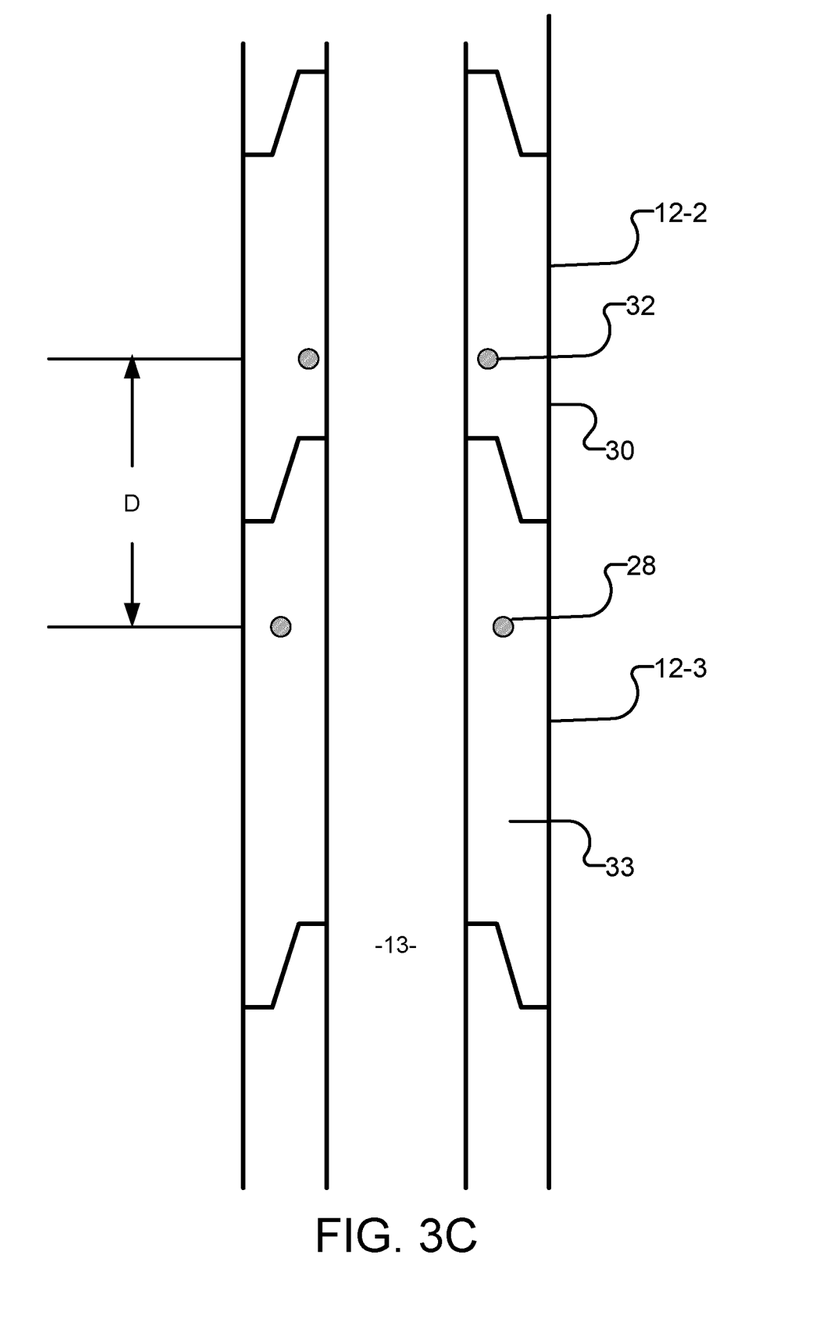

In FIG. 3B, tool 33 is uphole relative to tool 30. FIG. 3C is another example embodiment in which tool 33 is downhole relative to tool 30. It can be seen by comparing FIGS. 3B and 3C that inductive loop 28 should be either near the pin end or near the box end of sub 12-3 depending on whether sub 12-2 will be coupled to the pin end or the box end of sub 12-3.

Figure 3D:
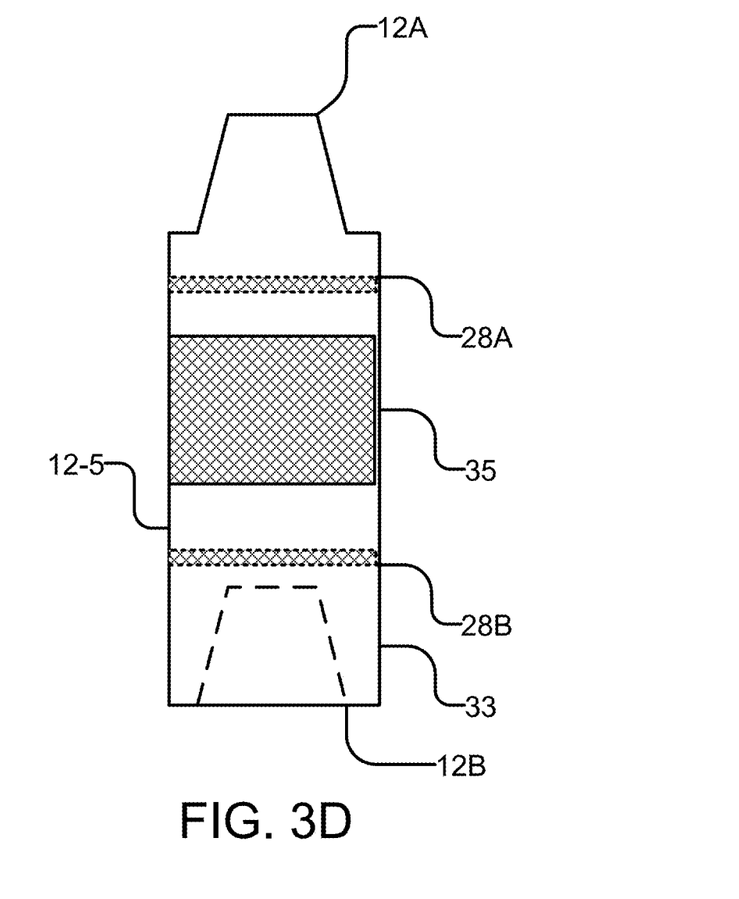
FIG. 3D is a schematic illustration of a sub configured to communicate with one or two adjacent subs. The illustrated sub may provide short-hop or longer-range telemetry to communicate data from the one or two adjacent subs to surface equipment and/or to other downhole equipment.

In some embodiments, of which FIG. 3D is an example, a sub 12-5 containing tool 33 includes inductive loops 28 near both ends of sub 12-5. Inductive loop 28A near pin end 12A and inductive loop 28B near box end 12B are shown in FIG. 3D. A controller 34 of tool 33 may select which one of inductive loops 28A and 28B will be used to communicate with a tool 30. A sub 12-5 containing a tool 33 as shown in FIG. 3D may be used in conjunction with a tool 30 that is either uphole from or downhole from the sub 12-5. In cases where sub 12-5 is coupled into drill string 12 between two tools 30 (which may provide different functionalities) the controller 34 of tool 33 may communicate with an uphole one of the tools 30 by way of inductive loop 28A and the other one of the tools by way of inductive loop 28B.

Figure 3E:
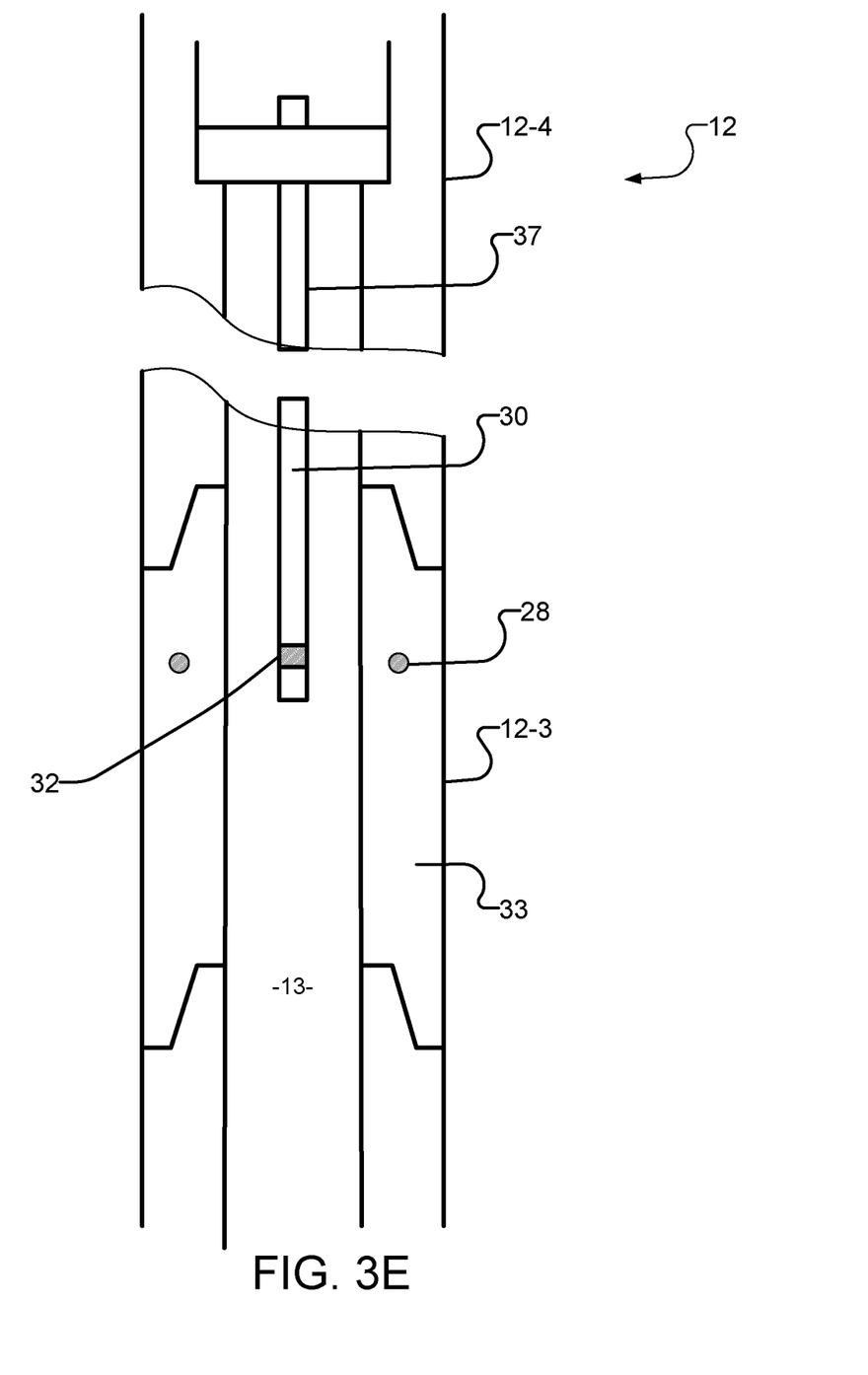
FIG. 3E is a schematic illustration of a section of drill string that includes a sub containing electronics arranged to communicate with a probe based tool received within a bore of the drill string.

In FIG. 3E tool 30 is provided in a probe 37 which is landed in a drill-string section 12-4 that is located adjacent to sub 12-3. Tool 33 is provided in sub 12-3 as described above. Tool 33 includes inductive loop 28. Tool 30 includes an inductive loop 32 which is located near to inductive loop 28.

Figure 4:
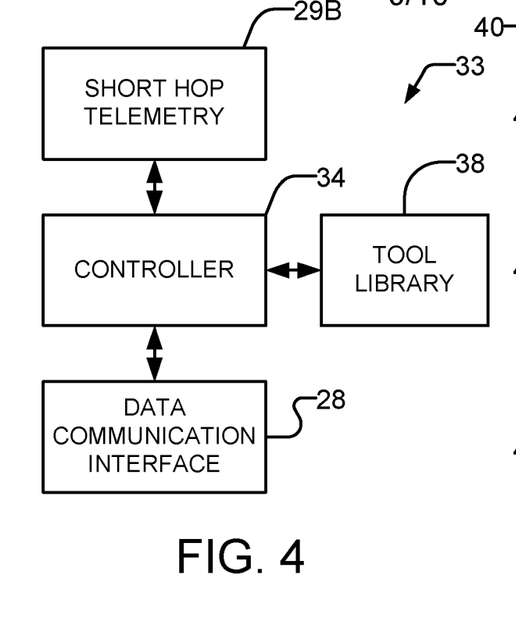
FIG. 4 is a block diagram of an example downhole tool.

A tool 33 as described herein may be adapted to communicate with any of a plurality of tools 30, each of which may communicate using different frequencies and protocols. Each of tools 30 may provide different data values. These data values may be processed downhole, used as control inputs for downhole processes and/or transmitted to surface equipment. As shown in FIG. 4, tool 33 may optionally include a tool library 38. Tool library 38 cross-references discoverable characteristics of known tools 30 with communications protocols for tool 33 to use in communicating with those tools 30. Tool library 38 may also include information identifying the data values available from each tool 30. If signals from tool 30 are encrypted, tool library 38 may include a key for decrypting the signals.

Tool library 38 may comprise a data store accessible to controller 34 which includes a data structure containing the above information.

Figure 4A:
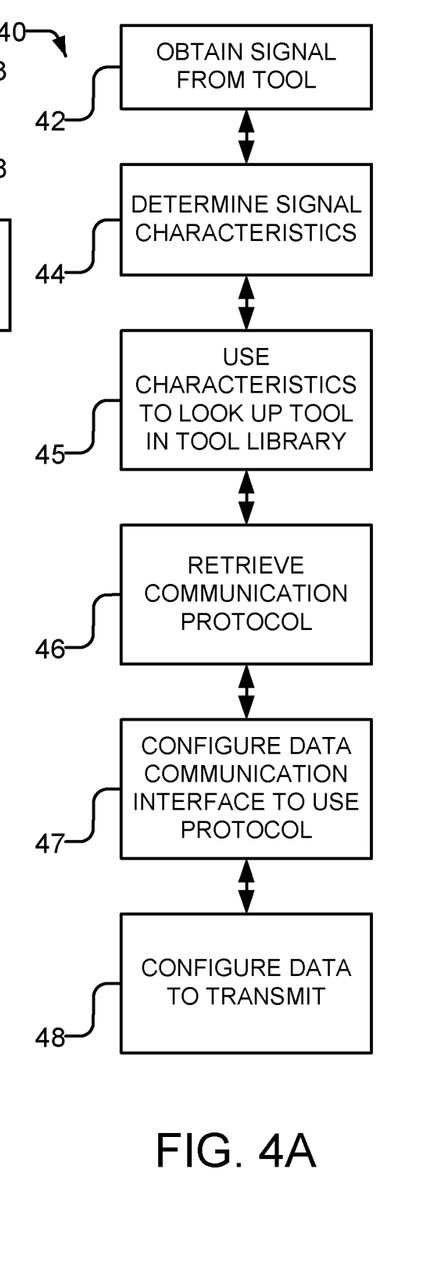
FIG. 4A is a block diagram of a configuration method for establishing data communication (particularly short-range data communication) with a downhole tool.

FIG. 4A is a flow chart illustrating a method that a tool 33 may perform for establishing data communication with a tool 30. Block 42 involves obtaining a signal from tool 30. This may be done by way of interface 28. Block 42 may involve passively listening for a signal and/or sending signals to tool 30 by way of interface 28. In some embodiments tool 33 sends a sequence of different wake-up signals to tool 30. The signals may, for example, differ in frequency, communication protocol and/or content.

Block 44 analyzes the signal obtained in block 42. Block 44 may, for example, determine one or more of: a frequency or frequencies on which the signal is transmitted; method that the signal is encoded (tool 33 may try various ways to decode the signal and see which one(s) work and/or may observe characteristics of the signal such as how the signal appears to be modulated).

Block 45 uses the information derived in block 44 to look up the tool 30 in tool library 38. Assuming that the information from block 44 matches a known tool 30 then method 40 proceeds to block 46 which retrieves a communication protocol from tool library 38. Block 47 configures data communication interface 28 using information from tool library 38 to communicate with the known tool 30.

In optional block 48, tool 33 configures itself to select a subset of data from tool 30 to transmit. For example, tool 33 may configure itself to transmit to tool 20 every Nth value for a first parameter and every Mth value for a second parameter made available by tool 30. Here, M and N are integers that may be the same or different. This capability may be applied to reduce data traffic uphole from tool 33 and also to reduce power requirements of tool 33 by reducing the volume of data to be transmitted. Information specifying which data to select for a particular tool 30 may be provided in tool library 38. In other embodiments tool 33 is manually configured for use with a particular tool 30. The manual configuration may pick from a number of configurations in tool library 38 and/or may set specific parameters which specify the way that tool 33 handles obtaining, processing and/or transmitting data from a tool 30.

In some embodiments a tool 33 is not provided and tool 30 communicates directly with tool 20 as shown in FIG. 2. In some such embodiments tool 20 is compact (particularly in length). In any of the embodiments depicted in FIGS. 1 to 3E tool 33 may be replaced directly with tool 20. For example, tool 20 may be provided in the form of a sub that is coupled into a drill string immediately adjacent to a tool 30 or is arranged to communicate with a tool 30 that has the form factor of a probe located within bore 13 of the drill string. The probe may pass through the bore of the sub in some embodiments. An example of this construction is illustrated in FIG. 3E (with tool 33 replaced by tool 20).

As another example, a sub containing tool 20 (or tool 33) may be coupled directly to the end of a sub containing tool 30 at any location within the drill string, thereby automatically placing inductive loop 28 of tool 20 a distance D from inductive loop 32 of tool 30.

In some embodiments a tool 33 provides functionality in addition to that which is discussed above. For example, a tool 33 may include one or more sensors. Tool 33 may transmit outputs from the one or more signals to tool 20 or to other downhole tools.

FIG. 3E illustrates a section of drill string 12 which includes a sub 20 as described above (i.e. with tool 33 replaced by sub 20) and a probe suspended in a bore 13 of the drill string. Probe 30 has an inductive loop 32 which, when probe 30 is installed in the bore of the drill string, generally aligns (e.g. aligns within +/−3 feet (about 1 meter)) with a corresponding inductive loop 28 of sub 20.

In some embodiments a tool 20 may have reduced or minimal functionality. For example, a tool 20 may serve primarily to receive data from tool 33 and to transmit the received data directly or indirectly to surface equipment using EM telemetry or some other telemetry modality.

It is not mandatory that data interfaces 28, 32 be provided by inductive loops or coils. In addition or in the alternative a telemetry sub as described herein may include a data interface that provides a direct wired or optical connection or an alternative short-range wireless data connection, such as gap to gap electromagnetic telemetry (as described, for example, in PCT publication WO2015/031973), or an acoustical data connection between the telemetry sub and a downhole tool located in the drill string in close proximity to the telemetry sub. For example, alternative short-range wireless connections may include other forms of electromagnetic data communication such as Bluetooth™, WiFi, or a custom designed wireless transmitter that operates at an electromagnetic communication frequency in the range of 100 Hz to 1 GHz or the like. In some such embodiments, data interfaces 28, 32 are provided by commercially-available wireless communication devices such as single-chip wireless LAN transceiver chips. Such chips are available from suppliers such as Texas Instruments, Atmel and Broadcomm. In some embodiments, wireless communication is provided according to an IEEE 802.11standard such as 802.11n or 802.11 b/g.

In various embodiments described herein where sub 20 includes both a gap-based EM telemetry transmitter and an interface (e.g. 28) that facilitates data communication with another downhole tool, sub 20 may receive data from the other downhole tool by way of interface 28 and then re-transmit the data by way of the gap-based EM telemetry transmitter. The data may be received directly at surface equipment or passed to the surface equipment by one or more intermediate nodes that receive and then re-transmit the data.

Use of such equipment can occur according to a method involving generating data at a downhole tool (such as data from a rotary steerable tool, gamma sensor, a resistivity sensor, directional sensors, or the like) and transmitting the data using a short-range coil-based telemetry system (by, for example, modulating electrical current in a loop or coil according to the data to be transmitted). The data is received at a corresponding coil or loop in apparatus as described herein and then retransmitted using a gap-based EM telemetry system. Retransmitting the data may involve decoding the data and then re-encoding the data. The retransmitted data may be received at surface equipment or received at a node farther up the drill string from where it can again be retransmitted using gap-based EM telemetry, mud pulse telemetry or another suitable telemetry modality.

Some embodiments provide a drill string comprising a sub comprising a gap-based EM telemetry transmitter and a short-range telemetry receiver that may, for example, comprise a coil or loop. The sub is located in the drill string immediately adjacent to a tool configured to generate data and transmit the data by modulating electrical current in a loop or coil to yield a short range telemetry signal that is received at the sub. The drill string optionally includes a node configured to receive data transmitted by the gap-based EM telemetry transmitter and to retransmit the received data. In some embodiments the node comprises a plurality of telemetry transmitters and is configured to retransmit the received data using one or more of the plurality of telemetry transmitters. In some embodiments the node comprises an electrically insulating gap in the drill string and is configured to receive the data transmitted by the gap-based EM telemetry transmitter by monitoring a potential difference across the gap. The node may be separated from the sub by a plurality of drill string sections in some embodiments.

Figure 5:
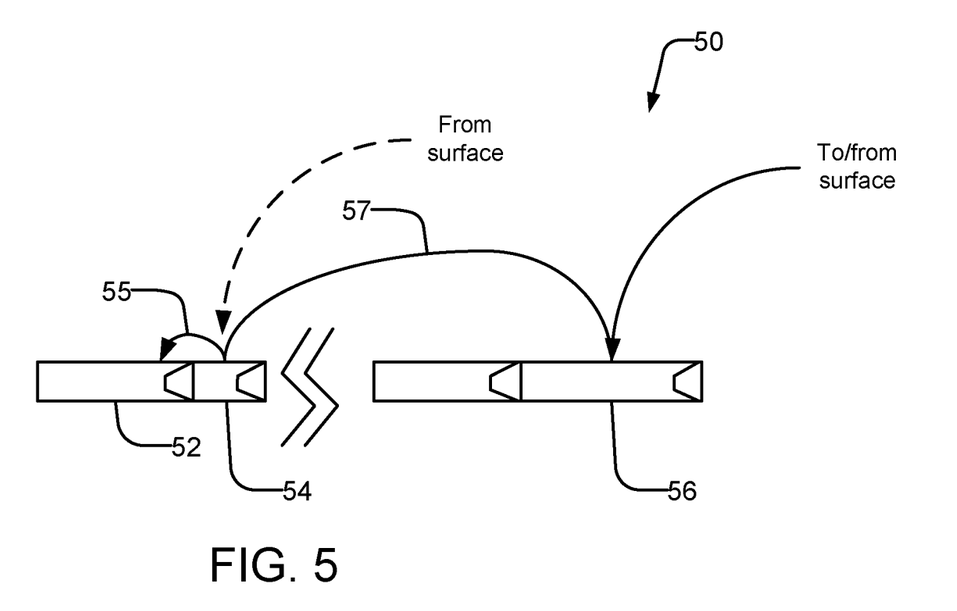
FIG. 5 shows a downhole system according to an example embodiment.

FIG. 5 shows an example downhole system 50 according to an example embodiment. Downhole system 50 comprises a first downhole tool 52, a second downhole tool 54 and a third downhole tool 56. In this embodiment, third downhole tool 56 has two-way communication with surface equipment. Second downhole tool 54 optionally has the capacity to receive downlink telemetry transmissions originating at surface equipment. First downhole tool 52 relies on the second downhole tool 54 to receive or send data. First and second downhole tools 52, 54 are in data communication by way of a close proximity data connection 55. This data connection may operate over a very short range. Second downhole tool 54 and third downhole tool 56 are in data connection with one another by way of a short hop data connection 57. First downhole tool 52 may, for example, comprise a rotary steering system (RSS).

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

Interpretation of Terms

Unless the context clearly requires otherwise, throughout the description and the claims:

"comprise," "comprising," and the like are to be construed in an inclusive sense, as opposed to an exclusive or exhaustive sense; that is to say, in the sense of "including, but not limited to".

"connected," "coupled," or any variant thereof, means any connection or coupling, either direct or indirect, between two or more elements; the coupling or connection between the elements can be physical, logical, or a combination thereof.

"herein," "above," "below," and words of similar import, when used to describe this specification shall refer to this specification as a whole and not to any particular portions of this specification.

"or," in reference to a list of two or more items, covers all of the following interpretations of the word: any of the items in the list, all of the items in the list, and any combination of the items in the list.

the singular forms "a," "an," and "the" also include the meaning of any appropriate plural forms.

Words that indicate directions such as "vertical," "transverse," "horizontal," "upward," "downward," "forward," "backward," "inward," "outward," "vertical," "transverse," "left," "right," "front," "back"," "top," "bottom," "below," "above," "under," and the like, used in this description and any accompanying claims (where present) depend on the specific orientation of the apparatus described and illustrated. The subject matter described herein may assume various alternative orientations. Accordingly, these directional terms are not strictly defined and should not be interpreted narrowly.

Where a component (e.g. a circuit, module, assembly, device, drill string component, drill rig system, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

Specific examples of systems, methods and apparatus have been described herein for purposes of illustration. These are only examples. The technology provided herein can be applied to systems other than the example systems described above. Many alterations, modifications, additions, omissions and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

It is therefore intended that the following appended claims and claims hereafter introduced are interpreted to include all such modifications, permutations, additions, omissions and sub-combinations as may reasonably be inferred. The scope of the claims should not be limited by the preferred embodiments set forth in the examples, but should be given the broadest interpretation consistent with the description as a whole.

What is claimed is:

1. A downhole system comprising first, second and third downhole tools,
    the first downhole tool in data communication with the third downhole tool by way of the second downhole tool;
    wherein the first downhole tool is in data communication with the second downhole tool by way of a close proximity data connection, the close proximity data connection comprising a short-range wireless data connection and the second downhole tool is in data communication with the third downhole tool by way of a short hop wireless data communication link having a range greater than that of the close proximity data connection; and
    the first and second downhole tools are provided in adjacent sections of a drill string;
    wherein the second downhole tool comprises a controller and a tool library and the controller is configured to: obtain a signal from the first downhole tool by way of the close proximity data connection, process the signal to identify one or more properties of the signal, use the one or more properties to look up in the tool library a set of one or more communication parameters, and configure the close proximity data connection according to the one or more communication parameters.

2. A downhole system according to claim 1 wherein the first and second downhole tools each has the form factor of a sub coupled in line with the drill string adjacent to one another.

3. A downhole system according to claim 2 wherein the close proximity data connection comprises a data connection between an inductive loop or coil in the first downhole tool and an inductive loop or coil of the second downhole tool.

4. A downhole system according to claim 3 wherein the inductive loop or coil of the first downhole tool extends around a bore of the drill string and the inductive loop or coil of the second downhole tool extends around the bore of the drill string.

5. A downhole system according to claim 3 wherein the inductive loop or coil of the first and second downhole tools are separated by a distance not exceeding 2 feet (about 60 cm).

6. A downhole system according to claim 2 wherein the sub of the second downhole tool comprises a first coupling at one end and a second coupling at another end, the second downhole tool comprises a first data interface adjacent to the first coupling and a second data interface adjacent to the second coupling, and the second downhole tool is operable to communicate with the first downhole tool by way of the first data interface or the second data interface.

7. A downhole system according to claim 6 wherein the second downhole tool is configurable to communicate with the first downhole tool by way of the first data interface and with another downhole tool by way of the second data interface.

8. A downhole system according to claim 6 wherein the first coupling comprises a pin coupling and the second coupling comprises a box coupling.

9. A downhole system according to claim 6 wherein the first and second data interfaces each comprises an inductive loop or coil.

10. A downhole system according to claim 1 wherein the close proximity data connection comprises an optical data connection.

11. A downhole system according to claim 1 wherein the close proximity data connection comprises a data connection between an inductive loop or coil in the first downhole tool and an inductive loop or coil of the second downhole tool.

12. A downhole system according to claim 1 wherein the one or more properties of the signal include a signal frequency.

13. A downhole system according to claim 1 wherein the one or more properties of the signal include a signal ID.

14. A downhole system according to claim 1 wherein the second downhole tool is configured to receive data from the first downhole tool on the close proximity data connection and to pass a subset of the received data to the third downhole tool by way of the short hop wireless data communication link.

15. A downhole system according to claim 14 wherein the subset is specified in the tool library.

16. A downhole system according to claim 1 wherein the first downhole tool comprises a rotary steerable system.

17. A downhole system comprising first, second and third downhole tools,
the first downhole tool in data communication with the third downhole tool by way of the second downhole tool;
wherein the first downhole tool is in data communication with the second downhole tool by way of a close proximity data connection, the close proximity data connection comprising a short-range wireless data connection and the second downhole tool is in data communication with the third downhole tool by way of a short hop wireless data communication link having a range greater than that of the close proximity data connection; and
the first and second downhole tools are provided in adjacent sections of a drill string;
wherein the close proximity data connection comprises a data connection between an inductive loop or coil in the first downhole tool and an inductive loop or coil of the second downhole tool;
wherein the first downhole tool has the form factor of a probe supported in a bore of the drill string and the second downhole tool has the form factor of a sub coupled in line with the drill string.

18. A downhole system according to claim 17 wherein the inductive loop or coil of the first downhole tool extends around a circumference of the probe and the inductive loop or coil of the second downhole tool extends around the bore of the drill string.

19. A downhole system according to claim 17 wherein the probe is landed in a drill string section that is coupled to the sub.

20. A downhole system according to claim 17 wherein the probe is supported in the bore between first and second spiders which are each supported by a corresponding landing in the drill string section.

21. A downhole system according to claim 20 comprising spacers between one or both of the first and second spiders and the corresponding landings, the spacers movable to adjust an axial positioning of the probe relative to the sub.

22. A downhole system according to claim 20 wherein the probe projects axially from the drill string section into the sub.

23. A downhole system according to claim 22 wherein at least an end of the probe that projects into the sub is movable and is biased toward the sub.

24. A downhole system according to claim 17 wherein the short hop wireless data communication link comprises a transmitter in the second downhole tool connected to apply a voltage across a first electrically-insulating gap portion that separates electrically-conductive parts of the drill string uphole and downhole from the first gap portion.

25. A downhole system according to claim 24 wherein the third downhole tool comprises a second electrically-insulating gap portion that separates electrically-conductive parts of the drill string uphole and downhole from the second gap portion and the third downhole tool comprises a short-hop telemetry receiver connected to monitor voltages across the second gap portion.

26. A downhole system according to claim 17 wherein the short hop wireless data communication link comprises a radio-frequency data communication protocol.

27. A downhole system according to claim 17 wherein the third downhole tool comprises a data telemetry transmitter operable to transmit data received from the first downhole tool by way of the second downhole tool to surface equipment.

28. A downhole system according to claim 27 wherein the data telemetry transmitter comprises an electromagnetic telemetry transmitter.

29. A downhole system according to claim 17 wherein the close proximity data connection provides two-way data communication.

30. A downhole system according to claim 17 wherein the short hop data connection provides two-way data communication.

31. A downhole system according to claim 17 wherein the third downhole tool comprises a telemetry receiver configured for receiving telemetry from surface equipment.

32. A downhole system according to claim 31 wherein one of the second downhole tool and the third downhole tool is configured to receive downlink telemetry commands for the first downhole tool, to identify the downlink telemetry commands as being for the first downhole tool and to forward the downlink telemetry commands to the first downhole tool by way of the close proximity data connection.

33. A downhole system according to claim 17 wherein the second downhole tool comprises a telemetry receiver configured for receiving telemetry from surface equipment.

34. A downhole system comprising first, second and third downhole tools,
the first downhole tool in data communication with the third downhole tool by way of the second downhole tool;
wherein the first downhole tool is in data communication with the second downhole tool by way of a close proximity data connection, the close proximity data connection comprising a short-range wireless data connection and the second downhole tool is in data communication with the third downhole tool by way of a short hop wireless data communication link having a range greater than that of the close proximity data connection; and
the first and second downhole tools are provided in adjacent sections of a drill string;
wherein the close proximity data connection comprises a data connection between an inductive loop or coil in the first downhole tool and an inductive loop or coil of the second downhole tool;
wherein the second downhole tool has the form factor of a probe supported in a bore of the drill string and the first downhole tool has the form factor of a sub coupled in line with the drill string.

35. A downhole system according to claim 34 wherein the inductive loop or coil of the second downhole tool extends around a circumference of the probe and the inductive loop or coil of the first downhole tool extends around the bore of the drill string.

36. A downhole system according to claim 34 wherein the inductive loop or coil of the second downhole tool is longitudinally aligned with the inductive loop or coil of the first downhole tool within 1 foot (about 30 cm).

37. A downhole system according to claim 34 wherein the probe is landed in a drill string section that is coupled to the sub.

38. A downhole system according to claim 37 wherein the drill string section has a length of 3 feet (about 1 meter) or less.

39. A downhole system according to claim 37 wherein the drill string section has a length of 6 feet (about 2 meters) or less.

40. A downhole system according to claim 37 wherein the drill string section has a length of 10 feet (about 3 meters) or less.

* * * * *